(12) United States Patent
Jiang

(10) Patent No.: US 10,470,169 B2
(45) Date of Patent: Nov. 5, 2019

(54) METHODS AND DEVICES FOR FEEDING BACK A MESSAGE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 21 days.

(21) Appl. No.: 15/869,346

(22) Filed: Jan. 12, 2018

(65) Prior Publication Data

US 2018/0206227 A1    Jul. 19, 2018

(30) Foreign Application Priority Data

Jan. 13, 2017    (CN) .......................... 2017 1 0025547

(51) Int. Cl.
*H04W 72/04*     (2009.01)
*H04L 5/00*      (2006.01)
*H04L 29/08*     (2006.01)

(52) U.S. Cl.
CPC ..... *H04W 72/0413* (2013.01); *H04W 72/048* (2013.01); *H04L 5/0037* (2013.01); *H04L 5/0055* (2013.01); *H04L 67/12* (2013.01)

(58) Field of Classification Search
CPC ............ H04L 5/0055; H04W 72/0413; H04W 72/0446

See application file for complete search history.

(56) References Cited

U.S. PATENT DOCUMENTS

2015/0358987 A1* 12/2015 Kogure ............. H04W 72/1205
                                                          370/336
2016/0014691 A1    1/2016 Rastogi
2016/0234820 A1    8/2016 Mallik et al.
2016/0249385 A1*   8/2016 Gage ....................... H04W 4/70
(Continued)

FOREIGN PATENT DOCUMENTS

| CN | 106301700 A   | 1/2017 |
| CN | 106714315 A   | 5/2017 |
| WO | 2016130362 A1 | 8/2016 |

OTHER PUBLICATIONS

International Search Report and Written Opinion issued in corresponding International Application No. PCT/CN2017/100237, dated Nov. 27, 2017, 11 pages.

(Continued)

*Primary Examiner* — Scott M Sciacca
(74) *Attorney, Agent, or Firm* — Arch & Lake LLP

(57) ABSTRACT

Provided are a method and a device for feeding back a message, a base station, and a user equipment, which belong to the field of communication. The method includes: acquiring transaction data to be transmitted to a UE when the UE is in an inactive state; allocating an uplink resource to the UE according to a service type of the transaction data, when one or more feedback messages from the UE are required for the transaction data; and transmitting a specified message to the UE. The specified message includes the transaction data and configuration information of the uplink resource. The UE transmits the one or more feedback messages on the uplink resource according to the configuration information.

10 Claims, 5 Drawing Sheets

(56) References Cited

U.S. PATENT DOCUMENTS

2017/0099664 A1\* 4/2017 Lunttila ............ H04W 72/0446

OTHER PUBLICATIONS

Huawei et al., "DL data transmission in RRC_INACTIVE," 3GPP TSG-RAN WG2 #96, R2-168546, Nov. 14-18, 2016, 3 pages, Reno, USA.
Catt, "DL small data transmission in inactive state," 3GPP TSG-RAN WG2 Meeting #96, R2-167955, Nov. 14-18, 2016, 3 pages, Reno, USA.
Fujitsu, "DL data reception in INACTIVE state," 3GPP TSG-RAN WG2 Meeting #96, R2-168235 (Update of R2-166486), Nov. 14-18, 2016, 2 pages, Reno, USA.
Oppo, "Discussion on Data transmission in "Inactive" State," 3GPP TSG-RAN WG2 Meeting #96, R2-167479, Nov. 14-18, 2016, 5 pages, Reno, USA.

\* cited by examiner

METHODS AND DEVICES FOR FEEDING BACK A MESSAGE

CROSS REFERENCE TO RELATED APPLICATION

This application is based upon and claims a priority to Chinese Patent Application Serial No. 201710025547.0, filed with the Status Intellectual Property Office of P. R. China on Jan. 13, 2017, the entire contents of which are incorporated herein by reference.

TECHNICAL FIELD

The present disclosure generally relates to the field of communication, and more particularly, to methods and devices for feeding back a message.

BACKGROUND

In 5th-Generation mobile communication, the third state (i.e. an inactive state) of a user equipment (UE) is introduced on the basis of idle and active states. Under the inactive state, a base station may transmit downlink transaction data to the UE, and some downlink transaction data needs one or more feedback messages from the UE to inform the base station about a reception result of the transaction data.

In the related art, the base station transmits the transaction data to the UE if there is the transaction data to be transmitted to the UE. After receiving the transaction data, the UE determines whether one or more feedback messages for the transaction data is required, and initiates a random access request to the base station if yes, to trigger a random access process, during which the base station allocates an uplink resource to the UE through a signaling interaction with the UE. According to the allocated uplink resource, the UE transmits the one or more feedback messages, such as Acknowledgement (ACK) or Non-Acknowledgment (NACK) is fed back on the allocated uplink resource.

SUMMARY

According to a first aspect of the present disclosure, there is provided a method for feeding back a message, applied in a base station and including: acquiring transaction data to be transmitted to a UE when the UE is in an inactive state; allocating an uplink resource to the UE according to a service type of the transaction data, when one or more feedback messages from the UE are required for the transaction data; and transmitting a specified message to the UE, in which the specified message includes the transaction data and configuration information of the uplink resource, the configuration information is configured to indicate a resource block (RB) corresponding to the uplink resource and a sub-frame location corresponding to the RB, and the UE transmits the one or more feedback messages on the uplink resource according to the configuration information.

According to a second aspect of the present disclosure, there is provided a method for feeding back a message, applied in a UE, including: receiving a specified message transmitted by a base station when the UE is in an inactive state, the specified message including transaction data and configuration information of an uplink resource, the configuration information being configured to indicate a RB corresponding to the uplink resource and a sub-frame location corresponding to the RB; generating one or more feedback messages according to a reception result of the transaction data; and transmitting the one or more feedback messages on the uplink resource to the base station according to the configuration information.

According to a third aspect of the present disclosure, there is provided a base station, including: a receiver, a transmitter, a memory, and a processor, wherein the receiver, the transmitter and the memory each are connected to the processor, the memory is configured to store instructions executable by the processor, and the processor is configured to: acquire transaction data to be transmitted to a UE when the UE is in an inactive state; allocate an uplink resource to the UE according to a service type of the transaction data, when one or more feedback messages from the UE are required for the transaction data; transmit a specified message to the UE, in which the specified message includes the transaction data and configuration information of the uplink resource, the configuration information is configured to indicate a RB corresponding to the uplink resource and a sub-frame location corresponding to the RB, and the UE transmits the one or more feedback messages on the uplink resource according to the configuration information.

According to a fourth aspect of the present disclosure, there is provided a UE, including: a processor; and a memory for storing instructions executable by the processor; the processor is configured to: receive a specified message transmitted by a base station when the UE is in an inactive state, in which the specified message includes the transaction data and configuration information of an uplink resource, the configuration information is configured to indicate a RB corresponding to the uplink resource and a sub-frame location corresponding to the RB; generate one or more feedback messages according to a reception result of the transaction data; and transmit the one or more feedback messages on the uplink resource to the base station according to the configuration information.

It should be appreciated that, the general description hereinbefore and the detail description hereinafter are explanatory and illustrative, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make objectives, technical solutions and advantages of the present disclosure clearer, implementations of the present disclosure will be described in detail below with reference to drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
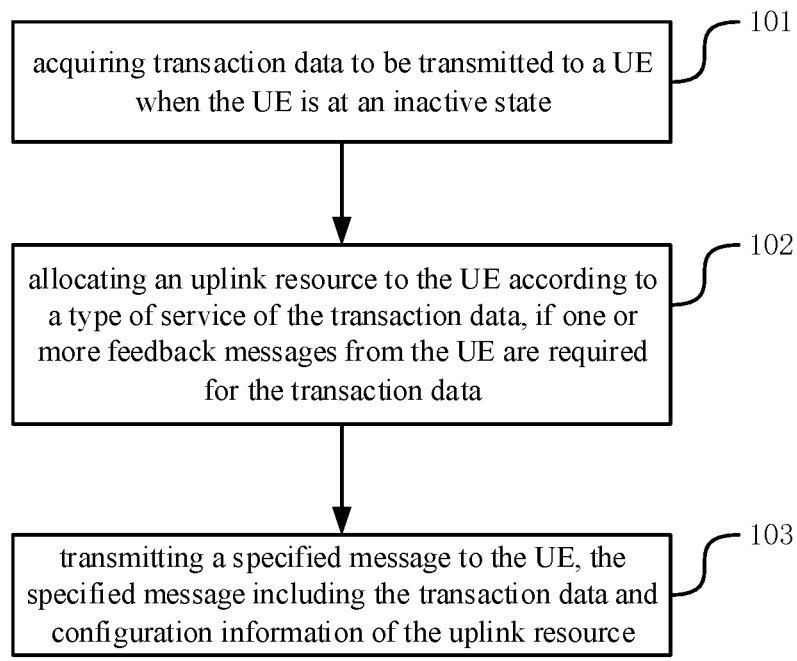
FIG. 1 is a flow chart showing a method for feeding back a message, according to an aspect of the disclosure.

FIG. 1 is a flow chart showing a method for feeding back a message, according to an aspect of the disclosure. The method may be implemented in a network such as an Internet of things (IoT) network. Here, IoT may be a network including a plurality of IoT devices, which may include one or more physical devices, vehicles, home appliances and other items embedded with electronics, software, sensors, actuators. The IoT devices have network connectivity which enables these IoT devices to connect and exchange data. Each IoT device may be uniquely identifiable through its embedded computing system but is able to inter-operate within the existing Internet infrastructure. Referring to FIG. 1, the method, applied in a base station, includes the following steps:

In block 101, transaction data to be transmitted to a user equipment (UE) is required, when the UE is in an inactive state. Here, the transaction data may include a data packet from an IoT device, where the data packet may be relatively small and does not need to be communicated frequently. For example, the data packet from the IoT device may only be communicated once in a preset period, where the preset period may last between a few minutes to a few hours.

In block 102, an uplink resource is allocated to the UE according to a service type of the transaction data, when one or more feedback messages from the UE are required for the transaction data. The service type may indicate the different characteristics of the transaction data. For example, the service type may indicate which type of data packet the IoT device needs to send in a specific service. The IoT device may need to send a feedback uplink data packet after receiving a downlink data packet in the inactive state.

In block 103, a specified message is transmitted to the UE. The specified message includes the transaction data and configuration information of the uplink resource. The configuration information is configured to indicate a resource block (RB) corresponding to the uplink resource and a sub-frame location corresponding to the RB. The UE transmits the one or more feedback messages on the uplink resource according to the configuration information.

With the method according to the present disclosure, the base station is capable of transmitting the transaction data and the configuration information of the uplink resource allocated for the transaction data together to the UE when the UE is in the inactive state, such that the UE is capable of transmitting the one or more feedback messages directly based on the allocated uplink resource after receiving the transaction data, thereby shortening a process for feeding back the message, improving feedback efficiency, and reducing signaling overheads.

In one or more embodiments of the present disclosure, allocating an uplink resource to the UE according to a service type of the transaction data includes:
determining the number of the one or more feedback messages which are required for the transaction data, according to the service type; and
allocating the uplink resource adapting with the number of the one or more feedback messages to the UE.

In one or more embodiments of the present disclosure, determining the number of the one or more feedback messages which are required for the transaction data, according to the service type includes:
determining a type of feedback which is required for the transaction data, according to the service type, the type of feedback including at least one of radio link control (RLC) layer feedback or application layer feedback;
determining the number of the one or more feedback messages which are required for the transaction data is 1, if the type of feedback is the RLC layer feedback;
determining the number of the one or more feedback messages which are required for the transaction data is 1, if the type of feedback is the application layer feedback; and
determining the number of the one or more feedback messages which are required for the transaction data is 2, if the type of feedback includes the RLC layer feedback and the RLC layer feedback.

In one or more embodiments of the present disclosure, the sub-frame location corresponding to the RB is configured to indicate an interframe space between sub-frames where the uplink resource and the specified message are located, respectively.

Alternative embodiments can be obtained by arbitrarily combining the embodiments described hereinbefore, and will not be elaborated herein.

Figure 2:
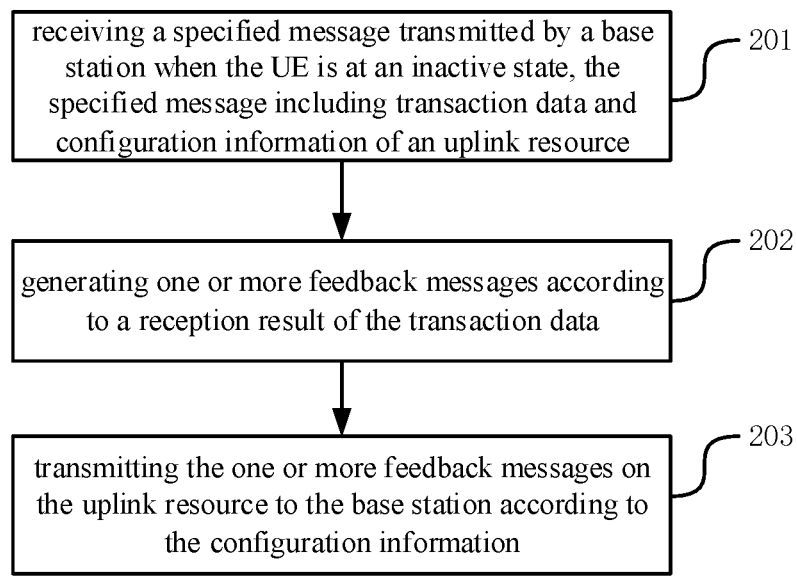
FIG. 2 is a flow chart showing a method for feeding back a message, according to an aspect of the disclosure.

FIG. 2 is a flow chart showing a method for feeding back a message, according to an aspect of the disclosure. Referring to FIG. 2, the method, applied in a UE, includes the following steps:

In block 201, a specified message transmitted by a base station is received when the UE is in an inactive state. The specified message includes transaction data and configuration information of an uplink resource. The configuration information is configured to indicate a RB corresponding to the uplink resource and a sub-frame location corresponding to the RB.

In block 202, one or more feedback messages are generated according to a reception result of the transaction.

In block 203, the one or more feedback messages are transmitted on the uplink resource to the base station according to the configuration information.

With the method according to the present disclosure, the UE is capable of receiving the transaction data and the configuration information of the uplink resource allocated by the base station for the transaction data together when the UE is in the inactive state, and transmitting the one or more feedback messages directly based on the allocated uplink resource after receiving the transaction data, thereby shortening a process for feeding back the message, improving feedback efficiency, and reducing signaling overheads.

In one or more embodiments of the present disclosure, the sub-frame location corresponding to the RB is configured to indicate an interframe space between sub-frames where the uplink resource and the specified message are located, respectively. Transmitting the one or more feedback messages on the uplink resource to the base station according to the configuration information includes:
determining a sub-frame location corresponding to the uplink resource according to the sub-frame where the specified message is located and the interframe space; and transmitting the one or more feedback messages to the base station on the sub-frame location corresponding to the uplink resource and on a resource indicated by the RB.

In one or more embodiments of the present disclosure, generating one or more feedback messages according to a reception result of the transaction data includes:

determining a type of feedback which is required for the transaction data, according to a service type of the transaction data, the type of feedback including at least one of RLC layer feedback or application layer feedback;

if the type of feedback includes the RLC layer feedback, generating a first feedback message according to a reception result of the transaction data at the RLC layer, the first feedback message being configured to indicate a reception result at the RLC layer; and if the type of feedback includes the application layer feedback, generating a second feedback message according to a reception result of the transaction data at the application layer, the second feedback message being configured to indicate a reception result at the application layer.

Alternative embodiments can be obtained by arbitrarily combining the embodiments described hereinbefore, and will not be elaborated herein.

Figure 3:
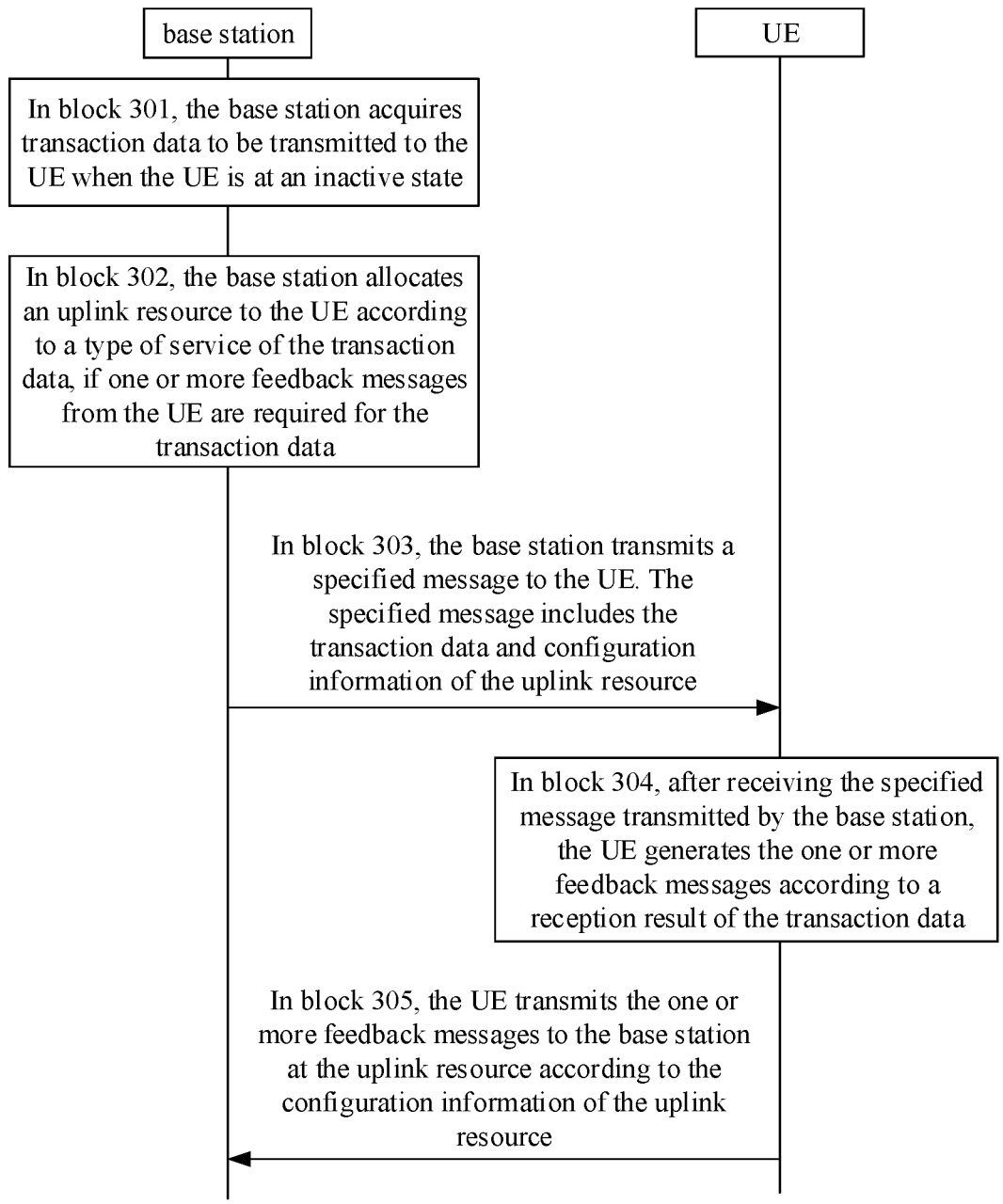
FIG. 3 is a flow chart showing a method for feeding back a message, according to an aspect of the disclosure.

FIG. 3 is a flow chart showing a method for feeding back a message, according to an aspect of the disclosure. Referring to FIG. 3, the method, related to a base station and UE as interactive bodies, includes the following steps:

In block 301, the base station acquires transaction data to be transmitted to the UE when the UE is in an inactive state.

When the UE completes a data interaction with the base station under an active state, the base station determines whether to allow the UE to enter the inactive state according to saved context information of the UE. The context information includes types of services supported by the UE and configuration information allocated and bearing for each service type. When the base station confirms that, among the services supported by the UE, there is a specific service where data transmission can be performed when the UE is in the inactive state, the base station transmits an inactive instruction to the UE, and the UE will enter the inactive state after receiving the inactive instruction. When detecting transaction data which belongs to the specific service and needs to be transmitted to the UE, the base station acquires the transaction data to be transmitted to the UE.

Herein, "specific service" refers to such a service where data transmission can be performed when the UE is in an inactive state, including at least one service characteristic as follows: a transmission time interval of the transaction data is greater than a certain threshold, a transaction data package has a size smaller than a certain size, or the number of transaction data packages within a certain period of time is less than a certain number. For example, the specific service may refer to a service related to Internet of Things. For example, the transmission time interval of the transaction data may be greater than or equal to half hour, or the transaction data package has a size within hundreds bytes, or the number of the transaction data packages within one hour is less than 10. All of these are just exemplary, and the present disclosure does not limit the specific values of the related service characteristics. In practical applications, the specific service may also be a service other that Internet of Things, which can be configured and modified by the base station according to the practical requirements.

In block 302, the base station allocates an uplink resource to the UE according to a service type of the transaction data, if one or more feedback messages from the UE are required for the transaction data.

When acquiring the transaction data to be transmitted to the UE, the base station may detect whether the one or more feedback messages from the UE are required for the transaction data according to the service type of the transaction data. If the one or more feedback messages from the UE are required for the transaction data, the base station allocates the uplink resource to the UE for transmitting the one or more feedback messages. A process that the base station allocates the uplink resource to the UE according to the service type of the transaction data may include: determining the number of the one or more feedback messages which are required for the transaction data, according to the service type of the transaction data; and allocating the uplink resource adapting with the number of the one or more feedback messages to the UE.

The base station may determine whether the one or more feedback messages from the UE are required for the acquired transaction data, according to supplementary information of the corresponding service supported by the UE. The supplementary information for any service may include the corresponding service type and feedback related information obtained during the data interaction of the service. The feedback related information includes a type of feedback which is required for the transaction data. The type of feedback includes RLC layer feedback and/or application layer feedback. For any service, if determining that the feedback message in a certain type is required for the service according to the supplementary information of the UE, the base station determines that the feedback message from the UE for the transaction data of the service is required. If determining that the feedback message in any type is not required for the transaction data according to the supplementary information of the UE, for example, feedback related information corresponding to the service is empty, the base station determines that the feedback message from the UE for the transaction data is not required. Then, the base station may directly transmit the acquired transaction data to the UE. The supplementary information of the UE may be provided to the base station through a non-access stratum (NAS) message when the UE is at the active state. For example, the UE may transmit the supplementary information of the service to a mobile management entity (MME) through the NAS message, and the MME provides the supplementary information of the service of the UE to the base station. The base station is capable of storing for each UE the supplementary information of the service supported by the UE.

The process of determining the number of the one or more feedback messages which are required for the transaction data according to the service type of the transaction data may include: determining a type of feedback which is required for the transaction data, according to the service type of the transaction data; determining the number of the one or more feedback messages corresponding to the transaction data is 1, if the type of feedback required is the RLC layer feedback; determining the number of the one or more feedback messages corresponding to the transaction data is 1, if the type of feedback required is the application layer feedback; and determining the number of the one or more feedback messages corresponding to the transaction data is 2, if the type of feedback required includes the RLC layer feedback and the application layer feedback.

The process of allocating the uplink resource adapting with the number of the one or more feedback messages to the UE may include: allocating the uplink resource including 1 RB to the UE, if the number of the one or more feedback messages is determined to be 1; and allocating the uplink resource including 2 RBs to the UE, if the number of the one or more feedback messages is determined to be 2.

In another embodiment of the present disclosure, the supplementary information provided to the base station by the UE may include the service type and the number of the one or more feedback messages required. For example, for a service A, the supplementary information may include that the service requires one uplink feedback message during a data interaction (i.e., the number of the one or more feedback messages corresponding to the service A is 1). The correspondence between the types of the services supported by the UE and the types of feedback may be pre-defined and configured to the base station and the UE. When acquiring the transaction data to be transmitted to the UE, the base station determines the number of the one or more feedback messages which are required for the transaction data, according to the supplementary information of the UE and the service type of the transaction data. If the number of the one or more feedback messages which are required for the transaction data is not 0, the base station determines that the one or more feedback messages from the UE are required for the transaction data, and the act of allocating the uplink resource adapting with the number of the one or more feedback messages to the UE is performed. If the number of the one or more feedback messages which are required for the transaction data is 0, the base station determines that the one or more feedback messages from the UE are not required for the transaction data, and directly transmits the transaction data to the UE.

Certainly, the base station may also acquire the types of the services supported by the UE and the number of the corresponding one or more feedback messages through subscription information of the UE. The subscription information may be pre-configured to the base station or transmitted to the base station by the UE, which shall not be construed to limit the present disclosure.

It should be illustrated that, in this embodiment, explanation is made just taking the RLC layer feedback and the application layer feedback as examples, which shall not be construed to limit the present disclosure, and the types of feedback which are required for the transaction data and the number of the corresponding one or more feedback messages will not be limited herein. For example, the feedback message for transaction data of a certain service from the UE may also be performed on Media Access Control (MAC) layer.

In block 303, the base station transmits a specified message to the UE. The specified message includes the transaction data and configuration information of the uplink resource.

In this embodiment, the base station may transmit the specified message to the UE by two ways.

In a first way, the specified message is a first paging message.

The base station transmits to the UE the first paging message, which carries the transaction data and the configuration information of the uplink resource.

In a second way, the specified message is a random access response message or a contention resolution message in a random access process.

In this way, when acquiring the transaction data to be transmitted to the UE, the base station transmits the second paging message to the UE to inform the UE to receive the transaction data, where the second paging message may carry indicating information for indicating the one or more feedback messages are required. After receiving the second paging message, the UE determines according to the indicating information that the one or more feedback messages are required, and transmits a random access request to the base station to apply for the uplink resource of the one or more feedback messages. In addition, the second paging message may carry the service type of the transaction data rather than the indicating information, and the UE determines whether the one or more feedback messages are required according to the service type, which is similar to what is described in block 302, as mentioned above. Alternatively, the base station transmits the second paging message through a designated bearer, which includes a field to indicate whether the one or more feedback messages are required, and the UE may determine whether to transmit the one or more feedback messages according to content of the field in the designated bearer. For a two-step random access process, the random access request of the UE carries a UE identifier. After receiving the random access request, the base station may reply a random access response message which carries the transaction data and the allocated configuration information of the uplink resource. For a four-step random access process, the transaction data and the configuration information of the uplink resource may be carried in the random access response message replied in the second step by the base station or in a contention resolution message replied in the fourth second step by the base station, which shall not be construed to limit the present disclosure.

The configuration information of the uplink resource is configured to indicate a RB corresponding to the uplink resource and a sub-frame location corresponding to the RB It should be illustrated that, if the base station determines that the number of the one or more feedback messages which are required for the transaction data is 1, the configuration information of the uplink resource may include configuration information of one RB and the sub-frame location corresponding to the one RB; if the base station determines that the number of the one or more feedback messages which are required for the transaction data is 2, the configuration information of the uplink resource may include configuration information of two RBs and the sub-frame locations corresponding to the individual RBs. The configuration information of each RB may be included in one uplink grant message, and is configured to indicate a subcarrier corresponding to the RB and a slot position of the RB at the sub-frame. The sub-frame location corresponding to the RB is configured to indicate an interframe space between sub-frames where the uplink resource and the specified message are located, respectively. The sub-frame location may also be an absolute sub-frame location, which is not limited by the present disclosure.

It should be illustrated that, in a Long Term Evolution (LTE) system, the base station may transmit the UL grant message to the UE at some specific sub-frame locations, and the UE is pre-configured with a correspondence between the sub-frame location of the UL grant message and the sub-frame location of the RB indicated by the UL grant message. In this embodiment, in order to ensure that the UE is capable of determining the sub-frame location of the RB, when transmitting the UL grant message to the UE through the specified message, the base station may determine the sub-frame location of the RB corresponding to the UL grant, according to the sub-frame location of the UL grant message and the correspondence between the sub-frame location of the UL grant message and the sub-frame location of the RB indicated by the UL grant message, and carry the sub-frame location in the specified message to transmit to the UE.

In block 304, after receiving the specified message transmitted by the base station, the UE generates the one or more feedback messages according to a reception result of the transaction data.

The UE acquires the transaction data transmitted by the base station according to the specified message, decodes the transaction data, and determines successful reception of the transaction data if the decoding succeeds. In this embodiment, the UE may decode the transaction data at different layers. For example, the UE may decode the transaction data at the RLC layer or the application layer. If the decoding succeeds at the RLC layer, it is determined that the reception of the transaction data succeeds at the RLC layer, otherwise, fails at the RLC layer. If the decoding succeeds at the application layer, it is determined that the reception of the transaction data succeeds at the application layer, otherwise, fails at the application layer.

The process that the UE generates the one or more feedback messages according to a reception result of the transaction data may be as follows. A type of feedback which is required for the transaction data is determined, according to a service type of the transaction data. If the type of feedback includes the RLC layer feedback, the UE generates a first feedback message according to a reception result of the transaction data at the RLC layer. When the reception of the transaction data succeeds at the RLC layer, the first feedback message is configured to indicate a successful reception at the RLC layer, in such a case, the first feedback message may be such as an ACK message. When the reception of the transaction data fails at the RLC layer, the first feedback message is configured to indicate an unsuccessful reception at the RLC layer, in such a case, the first feedback message may be such as a NACK message. If the type of feedback includes the application layer feedback, the UE generates a second feedback message according to a reception result of the transaction data at the application layer. When the reception of the transaction data succeeds at the application layer, the second feedback message is configured to indicate a successful reception at the application layer, in such a case, the second feedback message may be such as an ACK message. When the reception of the transaction data fails at the application layer, the second feedback message is configured to indicate an unsuccessful reception at the application layer, in such a case, the second feedback message may be such as a NACK message.

The type of feedback which is required for the transaction data may include at least one of RLC layer feedback or application layer feedback.

In block 305, the UE transmits the one or more feedback messages to the base station at the uplink resource according to the configuration information of the uplink resource.

In this embodiment, the UE may determine a time-frequency resource location of the uplink resource according to the configuration information of the uplink resource. It can be seen from the content in block 303, the sub-frame location corresponding to the RB in the configuration information may be an absolute sub-frame location or a relative sub-frame location. As an example, the block 305 will be explained in the following in such a case that the sub-frame location of the RB is the relative sub-frame location.

When the sub-frame location corresponding to the RB is configured to indicate the interframe space between sub-frames where the uplink resource and the specified message are located, respectively, the process of transmitting the one or more feedback messages on the uplink resource to the base station according to the configuration information may be as follows. A sub-frame location corresponding to the uplink resource is determined according to the sub-frame where the specified message is located and the interframe space. The one or more feedback messages may be transmitted to the base station on the sub-frame location corresponding to the uplink resource and on a resource indicated by the RB. For example, the UE receives the specified message at $N^{th}$ sub-frame, and the interframe space is 4. The UE determines that the allocated RB is at $(n+4)^{th}$ sub-frame, and transmits the feedback message on the allocated RB when the $(n+4)^{th}$ sub-frame comes. For example, if the feedback message needs to be transmitted at the RLC layer, the UE transmits the first feedback message on the RB based on the RLC layer when the sub-frame corresponding to the allocated RB comes. If the feedback message needs to be transmitted at the application layer, the UE transmits the second feedback message on the RB based on the application layer when the sub-frame corresponding to the allocated RB comes.

It should be illustrated that, if the feedback messages needs to be transmitted both at the RLC layer and the application layer, the configuration information of the uplink resource includes two RBs and the sub-frame locations corresponding to the individual RBs. As a data processing rate at the RLC layer is greater than that at the application layer, the UE may transmit the feedback message from the RLC layer on the RB corresponding to the sub-frame location which comes first, and transmit the feedback message from the application layer on the RB corresponding to the sub-frame location which comes later.

With the method according to the present disclosure, the base station is capable of transmitting the transaction data and the configuration information of the uplink resource allocated for the transaction data together to the UE when the UE is in the inactive state, such that the UE is capable of transmitting the one or more feedback messages directly based on the allocated uplink resource after receiving the transaction data, thereby shortening a process for feeding back the message, improving feedback efficiency, and reducing signaling overheads.

Figure 4:
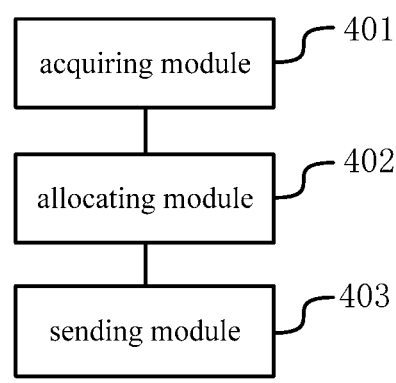
FIG. 4 is a block diagram showing a device for feeding back a message, according to an aspect of the disclosure.

FIG. 4 is a block diagram showing a device for feeding back a message, according to an aspect of the disclosure. Referring to FIG. 4, the device includes an acquiring module 401, an allocating module 402 and a transmitting module 403.

The acquiring module 401 is connected to the allocating module 402 and configured to acquire transaction data to be transmitted to a UE when the UE is in an inactive state. The allocating module 402 is connected to the transmitting module 403 and configured to allocate an uplink resource to the UE according to a service type of the transaction data, if one or more feedback messages from the UE are required for the transaction data. The transmitting module 403 is configured to transmit a specified message to the UE. The specified message includes the transaction data and configuration information of the uplink resource, the configuration information is configured to indicate a RB corresponding to the uplink resource and a sub-frame location corresponding to the RB. The UE transmits the one or more feedback messages on the uplink resource according to the configuration information.

In an embodiment, the allocating module 402 is configured to: determine the number of the one or more feedback messages which are required for the transaction data, according to the service type; and allocate the uplink resource adapting with the number of the one or more feedback messages to the UE In an embodiment, the allocating module 402 is configured to: determine a type of feedback which is required for the transaction data, according to the service type, the type of feedback including at least one of RLC layer feedback or application layer feedback; determine the number of the one or more feedback messages which are required for the transaction data is 1, if the type of feedback is the RLC layer feedback; determine the number of the one or more feedback messages which are required for the transaction data is 1, if the type of feedback is the application layer feedback; and determine the number of the one or more feedback messages which are required for the transaction data is 2, if the type of feedback includes the RLC layer feedback and the RLC layer feedback.

In an embodiment, the sub-frame location corresponding to the RB is configured to indicate an interframe space between sub-frames where the uplink resource and the specified message are located, respectively.

The device according to the present disclosure is capable of transmitting the transaction data and the configuration information of the uplink resource allocated for the transaction data together to the UE when the UE is in the inactive state, such that the UE is capable of transmitting the one or more feedback messages directly based on the allocated uplink resource after receiving the transaction data, thereby shortening a process for feeding back the message, improving feedback efficiency, and reducing signaling overheads.

Figure 5:
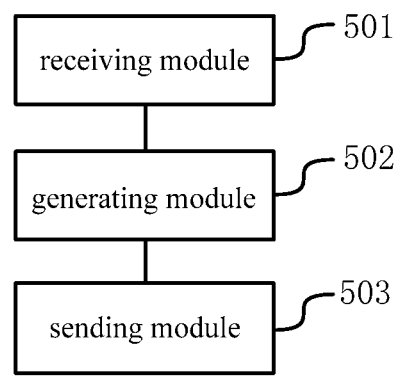
FIG. 5 is a block diagram showing a device for feeding back a message, according to an aspect of the disclosure.

FIG. 5 is a block diagram showing a device for feeding back a message, according to an aspect of the disclosure. Referring to FIG. 5, the device includes a receiving module 501, a generating module 502 and a transmitting module 503.

The receiving module 501 is connected to the generating module 502 and configured to receive a specified message transmitted by a base station when a UE is in an inactive state. The specified message includes transaction data and configuration information of an uplink resource. The configuration information is configured to indicate a RB corresponding to the uplink resource and a sub-frame location corresponding to the RB. The generating module 502 is connected to the transmitting module 503 and configured to generate one or more feedback messages according to a reception result of the transaction data. The transmitting module 503 is configured to transmit the one or more feedback messages on the uplink resource to the base station according to the configuration information.

In an embodiment, the sub-frame location corresponding to the RB is configured to indicate an interframe space between sub-frames where the uplink resource and the specified message are located, respectively. The transmitting module 503 is configured to: determine a sub-frame location corresponding to the uplink resource according to the sub-frame where the specified message is located and the interframe space; and transmit the one or more feedback messages to the base station on the sub-frame location corresponding to the uplink resource and on a resource indicated by the RB.

In an embodiment, the generating module 502 is configured to: determine a type of feedback which is required for the transaction data, according to a service type of the transaction data, the type of feedback including at least one of RLC layer feedback or application layer feedback; if the type of feedback includes the RLC layer feedback, generate a first feedback message according to a reception result of the transaction data at the RLC layer, the first feedback message being configured to indicate a reception result at the RLC layer; and if the type of feedback includes the application layer feedback, generate a second feedback message according to a reception result of the transaction data at the application layer, the second feedback message being configured to indicate a reception result at the application layer.

The device according to the present disclosure is capable of together receiving the transaction data and the configuration information of the uplink resource allocated by the base station for the transaction data when the UE is in the inactive state, and transmitting the one or more feedback messages directly based on the allocated uplink resource after receiving the transaction data, thereby shortening a process for feeding back message, improving feedback efficiency, and reducing signaling overheads.

With respect to the devices in the above embodiments, the specific manners for performing operations for individual modules therein have been described in detail in the embodiments regarding the related methods, which will not be elaborated herein.

Figure 6:
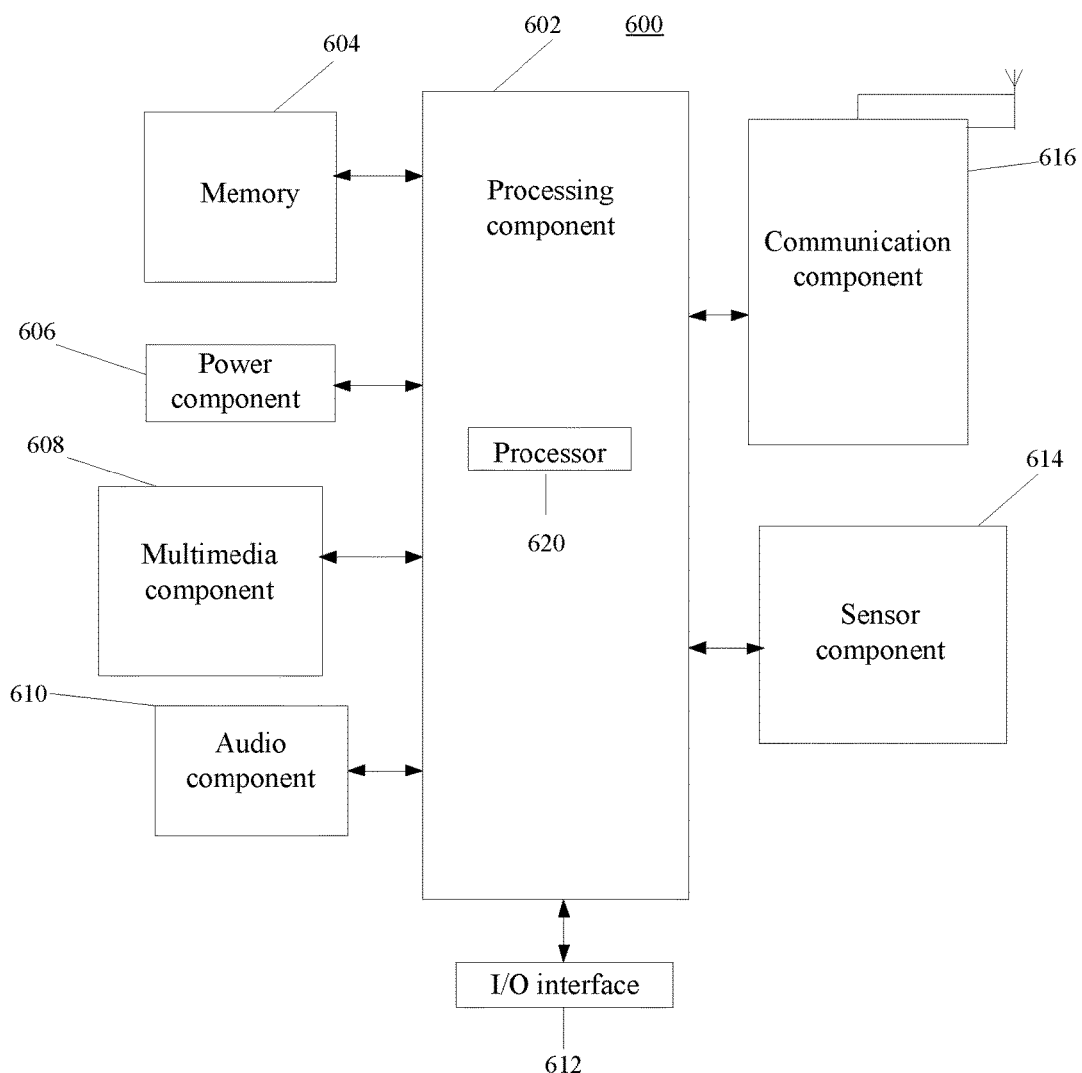
FIG. 6 is a schematic diagram illustrating a UE, according to an aspect of the disclosure.

FIG. 6 is a schematic diagram illustrating a UE, according to an aspect of the disclosure. For example, the UE 600 may be a mobile phone, a computer, a digital broadcast terminal, a messaging device, a gaming console, a tablet, a medical device, exercise equipment, a personal digital assistant, and the like.

Referring to FIG. 6, the UE 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the UE 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the UE 600. Examples of such data include instructions for any applications or methods operated on the UE 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the UE 600. The power component 606 may include a power management system, one or more power sources, and any other components associated with the generation, management, and distribution of power in the UE 600.

The multimedia component 608 includes a screen providing an output interface between the UE 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the UE 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the UE 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the UE 600. For instance, the sensor component 614 may detect an open/closed status of the UE 600, relative positioning of components, e.g., the display and the keypad, of the UE 600, a change in position of the UE 600 or a component of the UE 600, a presence or absence of user contact with the UE 600, an orientation or an acceleration/deceleration of the UE 600, and a change in temperature of the UE 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the UE 600 and other devices. The UE 600 can access a wireless network based on a communication standard, such as WiFi, 2G, or 3G, or a combination thereof. In one aspect of the disclosure, the communication component 616 receives a broadcast signal or broadcast associated information from an external broadcast management system via a broadcast channel. In one example, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 604, executable by the processor 620 in the UE 600, for performing the above-described methods. For example, the non-transitory computer-readable storage medium may be a ROM, a RAM, a CD-ROM, a magnetic tape, a floppy disc, an optical data storage device, and the like.

Figure 7:
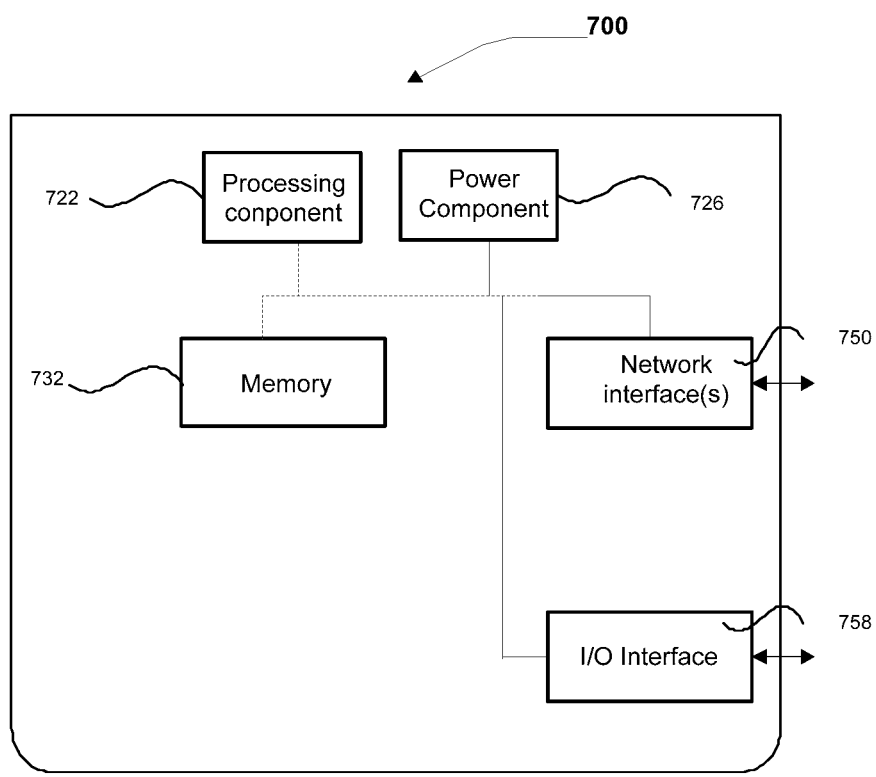
FIG. 7 is a schematic diagram illustrating a base station, according to an aspect of the disclosure.

FIG. 7 is a schematic diagram illustrating a base station, according to an aspect of the disclosure. Referring to FIG. 7, the base station 700 includes a processing component 722 (e.g. one or more processors), a memory resource represented by a memory 732 for storing instructions (such as application programs) executable by the processing component 722. The application programs stored in the memory 732 may include one or more modules (not shown). Each module may include a set of instructions for operations on the base station 700. Further, the processing component 722 may be configured to execute the sets of instructions and perform the operations on the base station 700, as described in the method for feeding back a message.

The base station 700 may also include a power supply 726, wired or wireless network interfaces 750, an input/output interfaces 758. The power supply 726 is configured to execute the power management of the base station 700. The wired or wireless network interfaces 750 are configured to connect the base station to the network. The base station 700 may operate an operating systems stored in the memory 732, such as Windows Server™, Mac OS X™, Unix™, Linux™, FreeBSD™, or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for feeding back a message, applied in a base station, and applied for services where data transmission is performed when a user equipment (UE) is in an inactive state, comprising:

acquiring transaction data to be transmitted to the UE when the UE is in the inactive state;

allocating an uplink resource to the UE according to a service type of the transaction data, when one or more feedback messages from the UE are required for the transaction data; and transmitting a specified message to the UE in the inactive state, wherein the specified message comprises the transaction data and configuration information of the uplink resource, the configuration information is configured to indicate a resource block (RB) corresponding to the uplink resource and a sub-frame location corresponding to the RB;

when the one or more feedback messages need to be transmitted at a radio link control (RLC) layer and/or an application layer, the configuration information of the uplink resource includes two RBs and the sub-frame locations corresponding to the individual RBs; and receiving the one or more feedback messages transmitted by the UE in the inactive state on the uplink resource according to the configuration information, wherein the feedback message from the RLC layer on the RB corresponds to the sub-frame location that comes first, and wherein the feedback message from the application layer on the RB corresponds to the sub-frame location that comes later.

2. The method of claim 1, wherein allocating the uplink resource to the UE according to the service type of the transaction data comprises:

determining a number of the one or more feedback messages which are required for the transaction data, according to the service type; and allocating the uplink resource adapting with the number of the one or more feedback messages to the UE.

3. The method of claim 2, wherein determining the number of the one or more feedback messages which are required for the transaction data, according to the service type comprises:

determining a type of feedback which is required for the transaction data, according to the service type, the type of feedback comprising at least one of RLC layer feedback or application layer feedback;

determining the number of the one or more feedback messages which are required for the transaction data is 1, when the type of feedback is the RLC layer feedback;

determining the number of the one or more feedback messages which are required for the transaction data is 1, when the type of feedback is the application layer feedback; and determining the number of the one or more feedback messages which are required for the transaction data is 2, when the type of feedback comprises the RLC layer feedback and the application layer feedback.

4. The method of claim 1, wherein the sub-frame location corresponding to the RB is configured to indicate an interframe space between respective sub-frames where the uplink resource and the specified message are located.

5. A method for feeding back a message, applied in a user equipment (UE) in an inactive state, and applied for services where data transmission is performed when the UE is in the inactive state, comprising:

receiving a specified message transmitted by a base station when the UE is in the inactive state, the specified message comprising transaction data and configuration information of an uplink resource, the configuration information being configured to indicate a resource block (RB) corresponding to the uplink resource and a sub-frame location corresponding to the RB;

generating one or more feedback messages according to a reception result of the transaction data; and transmitting the one or more feedback messages in the inactive state from a radio link control (RLC) layer and/or an application layer on the uplink resource to the base station according to the configuration information, wherein the feedback message from the RLC layer on the RB corresponds to the sub-frame location that comes first, and wherein the feedback message from the application layer on the RB corresponds to the sub-frame location that comes later.

6. The method of claim 5, wherein the sub-frame location corresponding to the RB is configured to indicate an interframe space between respective sub-frames where the uplink resource and the specified message are located, and transmitting the one or more feedback messages on the uplink resource to the base station according to the configuration information comprises:

determining a sub-frame location corresponding to the uplink resource according to the sub-frame where the specified message is located and the interframe space; and transmitting the one or more feedback messages to the base station on the sub-frame location corresponding to the uplink resource and on a resource indicated by the RB.

7. The method of claim 5, wherein generating one or more feedback messages according to a reception result of the transaction data comprises:

determining a type of feedback which is required for the transaction data, according to a service type of the transaction data, the type of feedback comprising at least one of RLC layer feedback or application layer feedback;

when the type of feedback comprises the RLC layer feedback, generating a first feedback message according to a reception result of the transaction data at the RLC layer, the first feedback message being configured to indicate a reception result at the RLC layer; and when the type of feedback comprises the application layer feedback, generating a second feedback message according to a reception result of the transaction data at the application layer, the second feedback message being configured to indicate a reception result at the application layer.

8. A user equipment (UE), comprising:

a processor; and a memory for storing instructions executable by the processor;

wherein the processor is configured to:

receiving a specified message transmitted by a base station when the UE is in an inactive state, the specified message comprising transaction data and configuration information of an uplink resource, the configuration information being configured to indicate a resource block (RB) corresponding to the uplink resource and a sub-frame location corresponding to the RB;

generate one or more feedback messages according to a reception result of the transaction data; and transmit the one or more feedback messages in the inactive state from a radio link control (RLC) layer and/or an application layer on the uplink resource to the base station according to the configuration information, wherein the feedback message from the RLC layer on the RB corresponds to the sub-frame location that comes first, and wherein the feedback message from the application layer on the RB corresponds to the sub-frame location that comes later.

9. The user equipment of claim 8, wherein the sub-frame location corresponding to the RB is configured to indicate an interframe space between respective sub-frames where the uplink resource and the specified message are located, and the processor is configured to transmit the one or more feedback messages on the uplink resource to the base station according to the configuration information by acts of:
  determining a sub-frame location corresponding to the uplink resource according to the sub-frame where the specified message is located and the interframe space; and
  transmitting the one or more feedback messages to the base station on the sub-frame location corresponding to the uplink resource and on a resource indicated by the RB.

10. The user equipment of claim 8, wherein the processor is configured to generate one or more feedback messages according to a reception result of the transaction data by acts of:
  determining a type of feedback which is required for the transaction data, according to a service type of the transaction data, the type of feedback comprising at least one of RLC layer feedback or application layer feedback;
  when the type of feedback comprises the RLC layer feedback, generating a first feedback message according to a reception result of the transaction data at the RLC layer, the first feedback message being configured to indicate a reception result at the RLC layer; and
  when the type of feedback comprises the application layer feedback, generating a second feedback message according to a reception result of the transaction data at the application layer, the second feedback message being configured to indicate a reception result at the application layer.

* * * * *